United States Patent
Sumikawa

(10) Patent No.: US 10,730,399 B2
(45) Date of Patent: Aug. 4, 2020

(54) FUEL CELL VEHICLE

(71) Applicant: Toyota Jidosha Kabushiki Kaisha, Toyota-shi Aichi-ken (JP)

(72) Inventor: Hiroki Sumikawa, Nisshin (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 52 days.

(21) Appl. No.: 16/209,252

(22) Filed: Dec. 4, 2018

(65) Prior Publication Data
US 2019/0181470 A1  Jun. 13, 2019

(30) Foreign Application Priority Data
Dec. 8, 2017  (JP) .................................. 2017-236418

(51) Int. Cl.
*B60L 50/71* (2019.01)
*H01M 8/04082* (2016.01)
*H01M 8/04223* (2016.01)
*H01M 8/241* (2016.01)

(52) U.S. Cl.
CPC ......... *B60L 50/71* (2019.02); *H01M 8/04082* (2013.01); *H01M 8/04223* (2013.01); *H01M 8/241* (2013.01); *B60Y 2400/202* (2013.01); *H01M 2250/20* (2013.01)

(58) Field of Classification Search
CPC ............. H01M 8/04223; H01M 8/241; H01M 8/04082
See application file for complete search history.

(56) References Cited

U.S. PATENT DOCUMENTS

| | | | |
|---|---|---|---|
| 6,589,683 B2* | 7/2003 | Staats, III | A63H 29/22 429/417 |
| 2002/0187380 A1 | 12/2002 | Tanaka et al. | |
| 2002/0189873 A1 | 12/2002 | Mizuno | |
| 2008/0090122 A1* | 4/2008 | Andreas-Schott | H01M 8/04089 429/434 |
| 2008/0233045 A1* | 9/2008 | Ozkan | B01J 23/002 423/655 |

(Continued)

FOREIGN PATENT DOCUMENTS

| CA | 2958391 A1 | 8/2017 |
|---|---|---|
| JP | 2002367647 A | 12/2002 |

(Continued)

*Primary Examiner* — Matthew J Merkling
(74) *Attorney, Agent, or Firm* — Dinsmore & Shohl LLP

(57) ABSTRACT

The fuel cell vehicle includes a housing case having a stack housing portion that houses a fuel cell stack, and a high voltage component housing portion that houses a high voltage component, is disposed above the stack housing portion, and allows gas to be circulated to and from the stack housing portion; and pressure relief mechanisms provided on the front, rear, left, and right side walls respectively. A front side pressure relief mechanism is disposed in a position facing a radiator support, a left side pressure relief mechanism is disposed in a position facing an apron member and suspension tower on the left side, a rear side pressure relief mechanism is disposed in a position facing a dash panel and cowl member, and a right side pressure relief mechanism is disposed in a position facing an apron member and suspension tower on the right side.

6 Claims, 2 Drawing Sheets

(56) References Cited

U.S. PATENT DOCUMENTS

| | | | |
|---|---|---|---|
| 2009/0121191 A1* | 5/2009 | Tillman | B01D 53/75 |
| | | | 252/373 |
| 2010/0065359 A1 | 3/2010 | Jufuku et al. | |
| 2010/0209797 A1 | 8/2010 | Katano et al. | |
| 2016/0190632 A1 | 6/2016 | Itoga | |
| 2017/0101031 A1 | 4/2017 | Ohashi | |
| 2017/0222250 A1 | 8/2017 | Naito | |
| 2019/0181486 A1* | 6/2019 | Katayama | H01M 8/2475 |

FOREIGN PATENT DOCUMENTS

| | | |
|---|---|---|
| JP | 2002370544 A | 12/2002 |
| JP | 2005149732 A | 6/2005 |
| JP | 2008130446 A | 6/2008 |
| JP | 2010177083 A | 8/2010 |
| JP | 5398214 B2 | 1/2014 |
| JP | 2016122502 A | 7/2016 |
| JP | 201774819 A | 4/2017 |
| JP | 2017135073 A | 8/2017 |
| JP | 2017-168276 A | 9/2017 |
| KR | 1020100009633 A | 1/2010 |
| KR | 1020170101129 A | 9/2017 |

* cited by examiner

FUEL CELL VEHICLE

CROSS REFERENCE TO RELATED APPLICATIONS

The present application claims priority from Japanese patent application JP 2017-236418 filed on Dec. 8, 2017, the content of which is hereby incorporated by reference into this application.

BACKGROUND

Technical Field

The present disclosure relates to a fuel cell vehicle including a fuel cell stack.

Examples of traditional technologies in the field of such fuel cell vehicles include the one described in JP 2017-74819 A. In a fuel cell vehicle described in JP 2017-74819 A, a fuel cell stack, boost converter, and inverter, stacked in this order from the bottom, are mounted in a front compartment on the front side of the vehicle.

Background Art

In fuel cell vehicles with such a structure, reduction in the number of parts has been considered by eliminating a partitioning member between a stack case that houses a fuel cell stack and a high voltage component case that houses a boost converter and the like so as to integrate the cases. However, when the stack case and high voltage component case are integrated, gas is allowed to circulate therebetween, and thus, if hydrogen leaks from the fuel cell stack for some reason, the leaked hydrogen is likely to accumulate in an upper portion of the high voltage component case. In order to prevent inconvenience that may occur due to such accumulation of hydrogen, for example, a pressure relief mechanism may be provided in the high voltage component case so as to release the pressure in the high voltage component case by deforming the pressure relief mechanism if the pressure exceeds a predetermined level. However, if the pressure relief mechanism is deformed while a hood covering the front compartment is open, another problem would arise that the deformed pressure relief mechanism may scatter upward.

The present disclosure has been made so as to solve such technical problems, and provides a fuel cell vehicle capable of suppressing upward scattering of the pressure relief mechanism.

SUMMARY

According to the present disclosure, there is provided a fuel cell vehicle including a fuel cell stack that includes a housing case having a stack housing portion that houses the fuel cell stack, and a high voltage component housing portion that houses a high voltage component connected to the fuel cell stack, that is disposed above the stack housing portion, and that allows gas to be circulated to and from the stack housing portion; and a pressure relief mechanism that is provided in the high voltage component housing portion of the housing case and that is made of material with a lower rigidity than that of the high voltage component housing portion, in which the housing case is mounted in a front compartment of the fuel cell vehicle, and the pressure relief mechanism is disposed in a position that faces at least one of a cowl member, a dash panel, an apron member, a suspension tower, or a radiator support of the fuel cell vehicle.

In the fuel cell vehicle according to the present disclosure, since the pressure relief mechanism is provided in the high voltage component housing portion of the housing case, even if any inconvenience occurs due to accumulation of hydrogen inside the high voltage component housing portion, the pressure inside the high voltage component housing portion can be released to the outside by allowing the pressure relief mechanism to be deformed before the high voltage component housing portion, so that the high voltage component housing portion can be prevented from being deformed or damaged. In addition, since the pressure relief mechanism is disposed in a position that faces at least one of the cowl member, dash panel, apron member, suspension tower, or radiator support, that is, the pressure relief mechanism is disposed on the periphery of the high voltage component housing portion, excluding the ceiling portion thereof, the pressure inside the high voltage component housing portion is released in the front, rear, left, and right directions of the vehicle, so that upward scattering of the pressure relief mechanism can be suppressed. Further, even if the pressure relief mechanism is deformed and scatters, since the scattering pressure relief mechanism bumps against at least one of the cowl member, dash panel, apron member, suspension tower, or radiator support that the pressure relief mechanism faces, scattering of the pressure relief mechanism in the front, rear, left, and right directions of the vehicle can be suppressed.

In some embodiments of the fuel cell vehicle according to the present disclosure, the pressure relief mechanism is disposed in a position that faces at least one of the cowl member or the dash panel. With such a configuration, scattering of the pressure relief mechanism to the rear of the front compartment as well as upward can be suppressed.

In some embodiments of the fuel cell vehicle according to the present disclosure, a clearance is provided between the pressure relief mechanism and the at least one of the cowl member or the dash panel, and a wiring harness is disposed above the pressure relief mechanism in the clearance. With such a configuration, the wiring, harness can be used as a member for suppressing the scattering of the pressure relief mechanism, so that the upward scattering of the pressure relief mechanism can be further suppressed without the need for increasing the number of parts.

Further, in some embodiments of the fuel cell vehicle according to the present disclosure, the pressure relief mechanism is disposed in a position that faces at least one of the apron member or the suspension tower. With such a configuration, the scattering of the pressure relief mechanism in the left and right direction of the front compartment as well as upward can be suppressed.

Furthermore, in some embodiments of the fuel cell vehicle according to the present disclosure, the pressure relief mechanism is disposed in a position that faces the radiator support. With such a configuration, the scattering of the pressure relief mechanism to the front of the front compartment as well as upward can be suppressed.

Moreover, in some embodiments of the fuel cell vehicle according to the present disclosure, the pressure relief mechanism is a hydrogen ventilation opening having a hydrogen permeable membrane. With such a configuration, the pressure relief mechanism also functions as the hydrogen ventilation opening, so that the increase in the number of parts due to installation of the pressure relief mechanism can be avoided.

According to the present disclosure, the upward scattering of the pressure relief mechanism can be suppressed.

DETAILED DESCRIPTION

Figure 1:
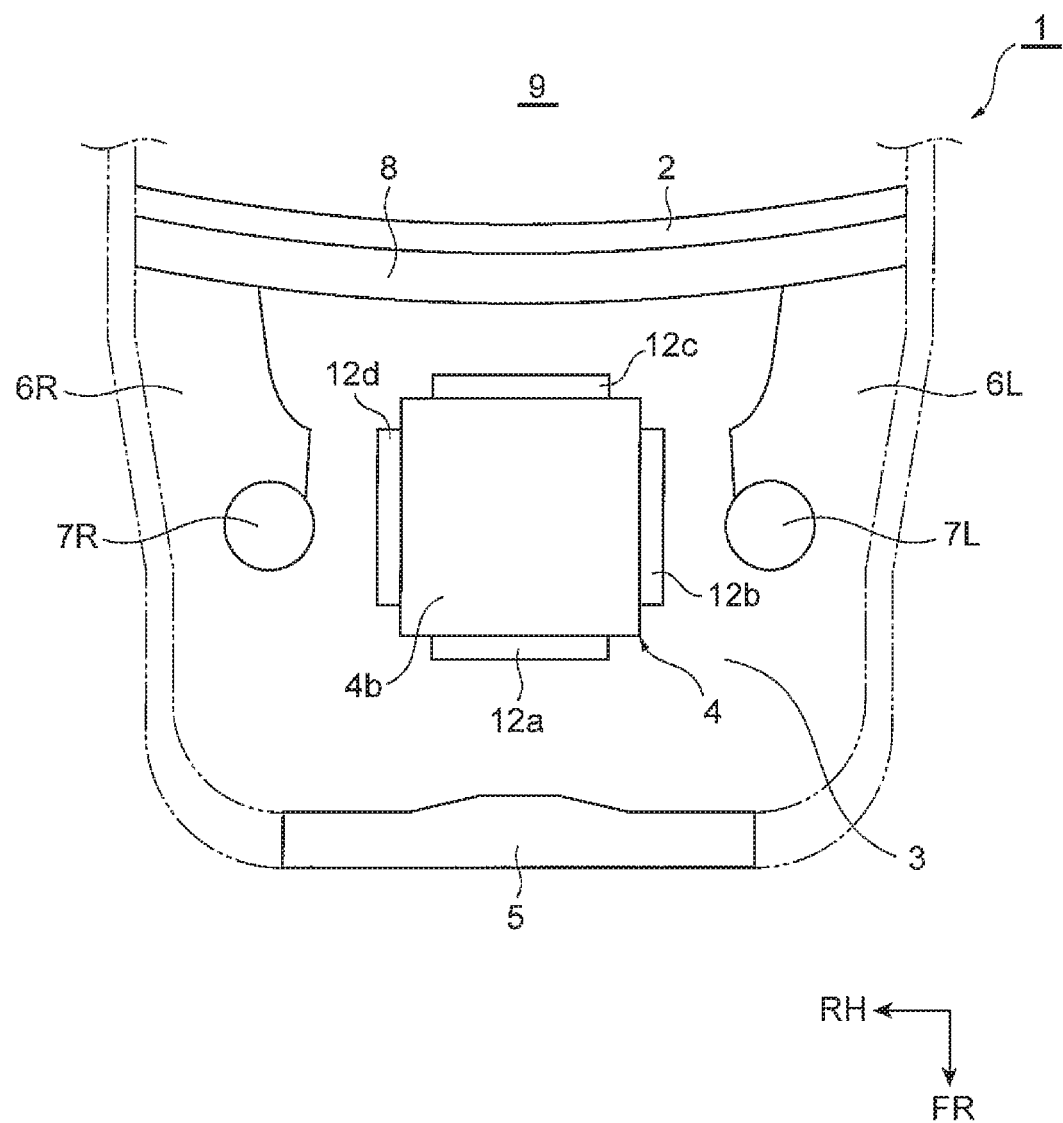
FIG. 1 is a schematic plan view of a fuel cell vehicle according to an embodiment.

An embodiment of a fuel cell vehicle according to the present disclosure will be described below with reference to the drawings. Arrows FR, RH, and UP in the drawings indicate the front side, right side, and upper side of a vehicle, respectively.

Figure 2:
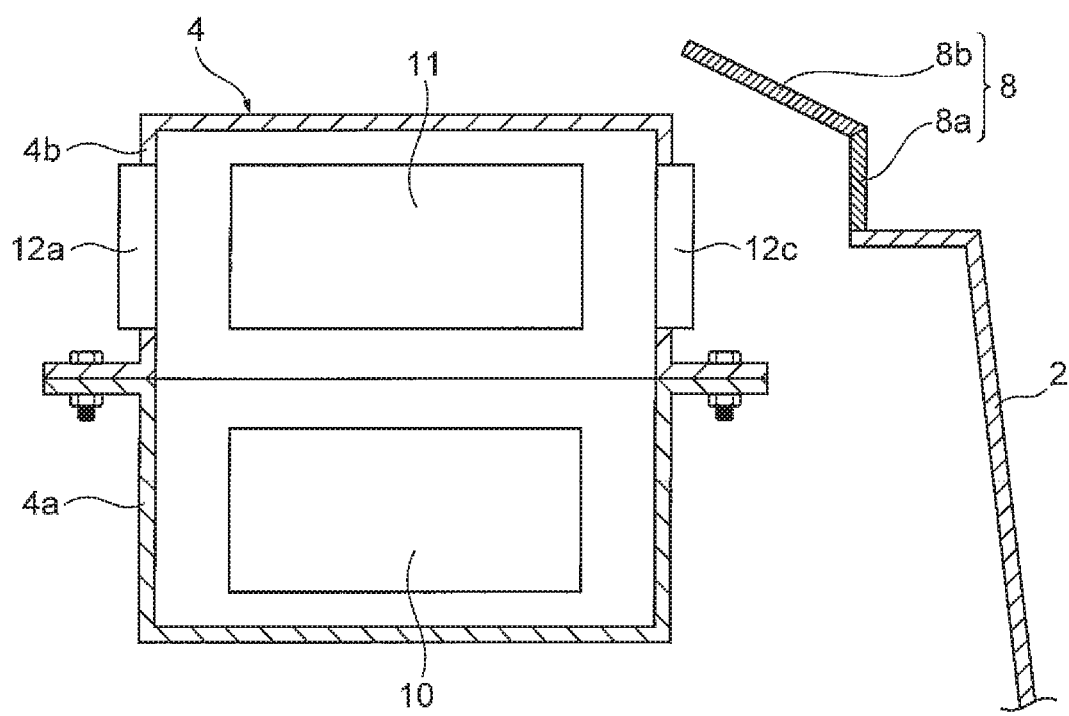
FIG. 2 is a schematic cross-sectional view that shows a positional relation between a rear side pressure relief mechanism provided in a high voltage component housing portion, and a dash panel and a cowl member.
Figure 2:

FIG. 1 is a schematic plan view of a fuel cell vehicle according to an embodiment, and FIG. 2 is a schematic cross-sectional view that shows a positional relation between a rear side pressure relief mechanism provided in a high voltage component housing, portion, and a dash panel and a cowl member. A fuel cell vehicle 1 of the present embodiment includes a dash panel 2 that extends in the left and right direction of the vehicle (also referred to as the vehicle width direction) and that separates a front compartment 3 from a vehicle interior 9, a housing case 4 that is mounted in the front compartment 3 at substantially the center thereof, a radiator support 5 that is disposed on the side opposite to the dash panel 2 across the housing case 4 (that is, the front side of the front compartment 3) and that extends in the left and right direction of the vehicle, a pair of apron members 6L and 6R that form the left and right side wall portions of the front compartment 3, and a left and, right pair of suspension towers 7L and 7R that are disposed on the inner sides of the apron members 6L and 6R, respectively.

A cowl member 8 that extends in the left and right direction of the vehicle is disposed above the dash panel 2. The cowl member 8 has a substantially L-shaped cross section and includes a cowl panel 8a that is coupled to the upper end of the dash panel 2 by welding, for example, and a cowl louver 8b that is coupled to the upper end of the cowl panel 8a.

The housing case 4 is a housing in a substantially rectangular parallelepiped shape and made of, for example, a metal material, and includes a stack housing portion 4a that houses the fuel cell stack 10 and a high voltage component housing portion 4b that houses a high voltage component 11, the high voltage component housing portion 4b being disposed above the stack housing portion 4a. The stack housing portion 4a and high voltage component housing portion 4b are, for example, housings in a substantially rectangular parallelepiped shape, each having an opening and a flange portion, and are provided with securing portions for securing the fuel cell stack 10 and high voltage component 11 to the inside thereof, respectively. The housing case 4 is integrally formed such that the housings of the stack housing portion 4a and high voltage component housing portion 4b abut each other while their openings face each other, and their flange portions are secured to each other with bolts (see FIG. 2). Further, gas is allowed to be circulated between the stack housing portion 4a and the high voltage component housing portion 4b.

The fuel cell stack 10 is a solid polymer electrolyte fuel cell that is formed by stacking a plurality of unit cells. Each unit cell (not shown) includes a membrane electrode assembly in which a polymer electrolyte membrane is sandwiched between an anode electrode and a cathode electrode, and a pair of separators that sandwich the membrane electrode assembly from the opposite sides thereof. Meanwhile, the high voltage component 11 is, for example, a boost converter adapted to boost the electric power of the fuel cell stack 10 and is electrically connected to the fuel cell stack 10.

Further, the fuel cell vehicle 1 of the present embodiment includes a plurality of pressure relief mechanisms (herein, four pressure relief mechanisms) that are provided in the high voltage component housing portion 4b and that are made of material with a lower rigidity than that of the high voltage component housing portion 4b. As shown in FIG. 1, the four respective pressure relief mechanisms are provided on the front, rear, left, and right side walls of the high voltage component housing portion 4b.

Specifically, the high voltage component housing portion 4b is provided, on its front side wall, with a front side pressure relief mechanism 12a. The front side pressure relief mechanism 12a is disposed in a position that faces the radiator support 5 disposed on the front side thereof. Further, the front side pressure relief mechanism 12a is positioned at substantially the same height as that of the radiator support 5 in the vertical direction of the vehicle (which is also referred to as the vehicle height direction).

The high voltage component housing portion 4b is provided, on its left side wall, with a left side pressure relief mechanism 12b. The left side pressure relief mechanism 12b is disposed in a position that faces the apron member 6L and suspension tower 7L on the left side. That is, the left side pressure relief mechanism 12b is formed so as to have portions that face the suspension tower 7L and apron member 6L in the front and rear direction of the vehicle. Further, the left side pressure relief mechanism 12b is positioned at substantially the same height as those of the apron member 6L and suspension tower 7L in the vertical direction of the vehicle. It should be noted that the left side pressure relief mechanism 12b need not necessarily be disposed in a position that faces both the apron member 6L and suspension tower 7L on the left side, but may be disposed in a position that faces either one of the apron member 6L or the suspension tower 7L on the left side.

In addition, the high voltage component housing portion 4b is provided, on its rear side wall, with a rear side pressure relief mechanism 12c. The rear side pressure relief mechanism 12c is disposed in a position that faces the dash panel 2 and cowl member 8 (see FIG. 2). That is, the rear side pressure relief mechanism 12c is formed so as to have portions that face the dash panel 2 and the cowl member 8 in the vertical direction of the vehicle. It should be noted that the rear side pressure relief mechanism 12c needs not necessarily be disposed in a position that faces both the dash panel 2 and cowl member 8, but may be disposed in a position that faces either one of the dash panel 2 or the cowl member 8.

The high voltage component housing portion 4b is provided, on its right side wall, with a right side pressure relief mechanism 12d. The right side pressure relief mechanism 12d is disposed in a position that faces the apron member 6R and suspension tower 7R on the right side. That is, the right side pressure relief mechanism 12d is formed so as to have portions that face the suspension tower 7R and apron member 6R in the front and rear direction of the vehicle.

Further, the right side pressure relief mechanism 12d is positioned at substantially the same height as those of the apron member 6R and suspension tower 7R in the vertical direction of the vehicle. It should be noted that the right side pressure relief mechanism 12d needs not necessarily be disposed in a position that faces both the apron member 6R and suspension tower 7R on the right side, but may be disposed in a position that faces either one of the apron member 6R or the suspension tower 7R on the right side.

Each of the front side pressure relief mechanism 12a, left side pressure relief mechanism 12b, rear side pressure relief mechanism 12c, and right side pressure relief mechanism 12d is a hydrogen ventilation opening having a hydrogen permeable membrane, and is formed such that the hydrogen permeable membrane is attached to an opening provided in a predetermined position on each side wall of the high voltage component housing portion 4b. The hydrogen permeable membrane is made of material that allows hydrogen to permeate therethrough, but prevents water and dust from permeating therethrough. Further, each pressure relief mechanism is made of material with a lower rigidity than that of the high voltage component housing portion 4b.

In the fuel cell vehicle 1 of the present embodiment, the respective pressure relief mechanisms are provided on the front, rear, left, and right side walls of the high voltage component housing portion 4b. Specifically, the front side pressure relief mechanism 12a is disposed in a position that faces the radiator support 5, the left side pressure relief mechanism 12b is disposed in a position that faces the apron member 6L and suspension tower 7L on the left side, the rear side pressure relief mechanism 12c is disposed in a position that faces the dash panel 2 and cowl member 8, and the right side pressure relief mechanism 12d is disposed in a position that faces the apron member 6R and suspension tower 7R on the right side. Moreover, each pressure relief mechanism is made of material with a lower rigidity than that of the high voltage component housing portion 4b. Therefore, even if any inconvenience occurs due to accumulation of hydrogen inside the high voltage component housing portion 4b, the pressure inside the high voltage component housing portion 4b can, be released to the outside by allowing the pressure relief mechanism to be deformed before the high voltage component housing portion 4b, so that the high voltage component housing portion 4b can be prevented from being deformed or damaged.

Further, since these pressure relief mechanisms are provided on the front, rear, left, and right side walls of the high voltage component housing portion 4b, but not on the ceiling portion (that is, the upper portion) of the high voltage component housing portion 4b, the pressure inside the high voltage component housing portion 4b is released in the front, rear, left, and right directions of the vehicle, so that upward scattering of the pressure relief mechanisms can be suppressed. Therefore, upward scattering of deformed pressure relief mechanisms when a hood is open, which has traditionally occurred, can be effectively prevented.

Furthermore, if the pressure relief mechanisms are deformed and scatter, scattering of the pressure relief mechanisms to the front, left, rear, and right sides of the high voltage component housing portion 4b is hindered by the radiator support 5 on the front side, the apron member 6L and suspension tower 7L on the left side, the dash panel 2 and cowl member 8 on the rear side, and the apron member 6R and suspension tower 7R on the right side, respectively. Thus, the scattering of the pressure relief mechanisms in the front and rear direction of the front compartment 3 (that is, in the front and rear direction of the vehicle) and in the left and right direction of the front compartment 3 (that is, in the left and right direction of the vehicle) can be prevented. As shown in FIG. 2, for example, if the rear side pressure relief mechanism 12c scatters, the scattering rear side pressure relief mechanism 12c bumps against the dash panel 2 and cowl member 8 that are disposed behind the rear side pressure relief mechanism 12c, and thus, the scattering of the rear side pressure relief mechanism 12c to the rear of the front compartment 3 can be hindered.

Moreover, each of the front side pressure relief mechanism 12a, left side pressure relief mechanism 12b, rear side pressure relief mechanism 12c, and right side pressure relief mechanism 12d is the hydrogen ventilation opening having the hydrogen permeable membrane. Thus, each pressure relief mechanism also functions as the hydrogen ventilation opening, so that the increase in the number of parts due to installation of the pressure relief mechanism can be avoided.

It should be noted that in the present embodiment, the pressure relief mechanism that functions as the hydrogen ventilation opening having the hydrogen permeable membrane has been described as an example, but the pressure relief mechanism may be a waterproof sheet, a sheet-metal cover, a sheet-metal bracket, a resin sheet, or a rubber plug that is attached to the opening of the high voltage component housing portion 4b, or a weakened portion that is provided in the high voltage component housing portion 4b and has a lower rigidity than other portions of the high voltage component housing portion 4b, such as a cutout groove and a thin portion.

Further, in the present embodiment, a clearance may be provided between at least one of the cowl member 8 or dash panel 2 and the rear side pressure relief mechanism 12c, so as to dispose a wiring harness above the rear side pressure relief mechanism 12c in the clearance. With such a configuration, the wiring harness can be used as a member for suppressing the scattering of the rear side pressure relief mechanism 12c, so that the upward scattering of the rear side pressure relief mechanism 12c can be further suppressed without the need for increasing the number of parts.

Furthermore, not all of the front side pressure relief mechanism 12a, left side pressure relief mechanism 12b, rear side pressure relief mechanism 12c, and right side pressure relief mechanism 12d are necessarily provided, but at least one of them may be provided. In addition, not all of the front, rear, left, and right side walls of the high voltage component housing portion 4b are necessarily provided with one pressure relief mechanism, but may be provided with two, for example.

Although the embodiment of the present disclosure has been described in detail, the present disclosure is not limited thereto, and various design changes can be made within the spirit and scope of the present disclosure described in the scope of the claims.

What is claimed is:

1. A fuel cell vehicle including a fuel cell stack, comprising:
 a housing case including a stack housing portion that houses the fuel cell stack, and a high voltage component housing portion that houses a high, voltage component connected to the fuel cell stack, that is disposed above the stack housing portion, and that allows gas to be circulated to and from the stack housing portion; and
 a pressure relief mechanism that is provided in the high voltage component housing portion of the housing case and that is made of material with a lower rigidity than that of the high voltage component housing portion, wherein:

the housing case is mounted in a front compartment of the fuel cell vehicle, and the pressure relief mechanism is disposed in a position that faces at least one of a cowl member, a dash panel, an apron member, a suspension tower, or a radiator support of the fuel cell vehicle.

2. The fuel cell vehicle according to claim 1, wherein the pressure relief mechanism is disposed in a position that faces at least one of the cowl member or the dash panel.

3. The fuel cell vehicle according to claim 2, wherein:

a clearance is provided between the pressure relief mechanism and the at least one of the cowl member or the dash panel, and a wiring harness is disposed above the pressure relief mechanism in the clearance.

4. The fuel cell vehicle according to claim 1, wherein the pressure relief mechanism is disposed in a position that faces at least one of the apron member or the suspension tower.

5. The fuel cell vehicle according to claim 1, wherein the pressure relief mechanism is disposed in a position that faces the radiator support.

6. The fuel cell vehicle according to claim 1, wherein the pressure relief mechanism is a hydrogen ventilation opening having a hydrogen permeable membrane.

* * * * *

UNITED STATES PATENT AND TRADEMARK OFFICE
CERTIFICATE OF CORRECTION

| | |
|---|---|
| PATENT NO. | : 10,730,399 B2 |
| APPLICATION NO. | : 16/209252 |
| DATED | : August 4, 2020 |
| INVENTOR(S) | : Hiroki Sumikawa |

It is certified that error appears in the above-identified patent and that said Letters Patent is hereby corrected as shown below:

On the Title Page

Item (72), Inventor 1, city, delete "Nisshin" and insert --Nisshin-shi Aichi--, therefor.

In the Specification

In Column 2, Line(s) 42, after "wiring", delete ",".

In Column 3, Line(s) 25, after "housing", delete ",".

In Column 3, Line(s) 37, after "and", delete ",".

In Column 5, Line(s) 41, after "can", delete ",".

In the Claims

In Column 6, Line(s) 59, Claim 1, after "high", delete ",".

Signed and Sealed this
Twenty-second Day of December, 2020

Andrei Iancu
*Director of the United States Patent and Trademark Office*